(12) United States Patent
Bradshaw

(10) Patent No.: US 12,422,384 B2
(45) Date of Patent: *Sep. 23, 2025

(54) HANDHELD X-RAY SYSTEM INCLUDING A STAND-ALONE DETECTOR PANEL

(71) Applicant: VIDERAY TECHNOLOGIES, INC., Charlestown, MA (US)

(72) Inventor: Paul Bradshaw, Boston, MA (US)

(73) Assignee: Videray Technologies, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/852,903

(22) PCT Filed: Apr. 26, 2024

(86) PCT No.: PCT/US2024/026510
§ 371 (c)(1),
(2) Date: Sep. 30, 2024

(87) PCT Pub. No.: WO2024/228921
PCT Pub. Date: Nov. 7, 2024

(65) Prior Publication Data
US 2025/0110064 A1    Apr. 3, 2025

Related U.S. Application Data

(60) Provisional application No. 63/499,226, filed on Apr. 29, 2023.

(51) Int. Cl.
*G01N 23/04* (2018.01)
*G01N 23/083* (2018.01)
*H04N 7/18* (2006.01)

(52) U.S. Cl.
CPC ........... *G01N 23/04* (2013.01); *G01N 23/083* (2013.01); *H04N 7/183* (2013.01);
(Continued)

(58) Field of Classification Search
CPC ................. G01N 23/04; G01N 23/083; G01N 2223/301; G01N 2223/316; G01N 2223/33
See application file for complete search history.

(56) References Cited

U.S. PATENT DOCUMENTS 4,799,247 A    1/1989  Annis et al.
5,022,062 A    6/1991  Annis
(Continued)

OTHER PUBLICATIONS

International Search Report and Written Opinion, dated Aug. 26, 2024, for corresponding International Application No. PCT/US2024/026510.

*Primary Examiner* — Courtney D Thomas
(74) *Attorney, Agent, or Firm* — Build IP, LLC; Robert V. Donahoe

(57) ABSTRACT

A system, apparatus and method for a handheld x-ray system including a stand alone detector panel. The system includes a handheld instrument with a high energy x-ray source (120 keV or greater). The detector panel includes a wireless communication system employed to transmit x-ray images that are captured by the panel to the handheld instrument where they are displayed in substantially real time. The handheld instrument also includes a camera and a set of line lasers that are employed together to align the x-ray beam emitted from the instrument with the object being scanned.

17 Claims, 5 Drawing Sheets

(52) U.S. Cl.
CPC . *G01N 2223/301* (2013.01); *G01N 2223/316* (2013.01); *G01N 2223/33* (2013.01)

(56) References Cited

U.S. PATENT DOCUMENTS

| | | | |
|---|---|---|---|
| 5,044,002 A | 8/1991 | Stein | |
| 5,181,234 A | 1/1993 | Smith | |
| 5,224,144 A | 6/1993 | Annis | |
| 5,493,596 A | 2/1996 | Annis | |
| 5,666,393 A | 9/1997 | Annis | |
| 6,151,381 A | 11/2000 | Grodzins et al. | |
| 6,192,104 B1 | 2/2001 | Adams | |
| 6,249,567 B1 | 6/2001 | Rothschild | |
| 6,434,219 B1 | 8/2002 | Rothschild | |
| 6,442,233 B1 | 8/2002 | Grodzins | |
| 6,453,007 B2 | 9/2002 | Adams et al. | |
| 6,459,761 B1 | 10/2002 | Grodzins et al. | |
| 6,459,764 B1 | 10/2002 | Chalmers | |
| 6,621,888 B2 | 9/2003 | Grodzins | |
| 7,623,614 B2 | 11/2009 | Shefsky | |
| 7,796,734 B2 | 9/2010 | Mastronardi et al. | |
| 7,826,589 B2 | 11/2010 | Kotowski | |
| 7,965,816 B2 | 6/2011 | Kravis et al. | |
| 7,983,391 B2 | 7/2011 | Machan et al. | |
| 8,199,996 B2 | 6/2012 | Hughes | |
| 8,437,451 B2 | 5/2013 | Van Lemel et al. | |
| 8,576,989 B2 | 11/2013 | Kaminski | |
| 8,761,338 B2 | 6/2014 | Safai | |
| 8,879,688 B2 | 11/2014 | Safai | |
| 8,908,831 B2 | 12/2014 | Bendahan | |
| 8,989,352 B2 | 3/2015 | Laws et al. | |
| 8,995,619 B2 | 3/2015 | Gray | |
| 9,014,339 B2 | 4/2015 | Grodzins et al. | |
| 9,020,103 B2 | 4/2015 | Grodzins | |
| 9,036,781 B1 | 5/2015 | Safai | |
| 9,052,271 B2 | 6/2015 | Grodzins et al. | |
| 9,090,974 B2 | 7/2015 | Yamaguchi | |
| 9,117,564 B2 | 8/2015 | Rommel | |
| 9,146,201 B2 | 9/2015 | Schubert | |
| 9,194,827 B2 | 11/2015 | Kang et al. | |
| 9,557,284 B2 | 1/2017 | Vogler | |
| 9,739,727 B2 | 8/2017 | Safai | |
| 10,102,937 B2 | 10/2018 | Carpenter et al. | |
| 10,151,716 B2 | 12/2018 | Belcher et al. | |
| 10,168,445 B2 | 1/2019 | Morton | |
| 10,172,573 B2 | 1/2019 | Öjelund | |
| 10,327,717 B2 | 6/2019 | Melman et al. | |
| 10,481,113 B2 | 11/2019 | Arodzero | |
| 10,656,304 B2 | 5/2020 | Grodzins | |
| 10,720,300 B2 | 7/2020 | Rommel et al. | |
| 10,754,057 B2 | 8/2020 | Bendahan | |
| 10,762,998 B2 | 9/2020 | Rothschild | |
| 10,770,195 B2 | 9/2020 | Rothschild | |
| 10,794,843 B2 | 10/2020 | Rothschild et al. | |
| 11,112,370 B2 | 9/2021 | Safai | |
| 11,525,929 B2 | 12/2022 | Rothschild | |
| 2008/0192897 A1 | 8/2008 | Piorek et al. | |
| 2009/0274274 A1* | 11/2009 | He | G01N 23/207 378/71 |
| 2010/0226476 A1 | 9/2010 | Pesce et al. | |
| 2012/0177180 A1 | 7/2012 | Van Lemel et al. | |
| 2013/0048489 A1 | 2/2013 | Yamaguchi | |
| 2015/0164443 A1 | 6/2015 | Laws et al. | |
| 2017/0358380 A1 | 12/2017 | Rothschild | |
| 2018/0294066 A1 | 10/2018 | Rothschild | |
| 2019/0069871 A1 | 3/2019 | Tkaczyk et al. | |
| 2024/0361255 A1* | 10/2024 | Bradshaw | H04N 7/183 |

* cited by examiner

HANDHELD X-RAY SYSTEM INCLUDING A STAND-ALONE DETECTOR PANEL

BACKGROUND OF INVENTION

1. Field of Invention

This invention relates generally to x-ray systems. More specifically, at least one embodiment relates to a system, apparatus and method for a handheld x-ray system including a stand alone detector panel.

2. Discussion of Related Art

Today, x-ray imaging is commonly employed in security screening to inspect the contents of objects by providing images of regions that are otherwise hidden from view, for example, within luggage, packages, parcels or larger objects. Handheld x-ray emitting devices, for example, handheld backscatter x-ray imaging devices, are often used in these applications. These handheld instruments tend to employ a high energy x-ray source (120 keV or greater) in combination with a sweeping pencil beam collimator. The sweeping pencil beam collimator operates to narrow the x-ray beam that passes to a chopper wheel from which the x-ray beam is output by the system. These instruments include shielding to reduce the emission of X-ray energy that is scattered from within the instrument. The shielding improves safety for the instrument-operators and those in the immediate vicinity of the instruments when used. In addition, because shielding reduces an amount of scattered x-ray energy, the allowable operating time of the instrument is increased for any single operator.

The size (radius) of the x-ray energy beam emitted an instrument including a sweeping pencil beam collimator is also reduced relative to the size of the x-ray energy beam emitted when collimators having other geometries are employed because the sweeping pencil beam collimator produces a more focused x-ray beam. The more focused x-ray beam also reduces the amount of radiation scattered from the object being scanned. However, the more focused nature of the sweeping pencil beam collimator requires that an operator move the x-ray producing instrument when scanning an object. That is, too adjust the aim of the x-ray instrument to fully x-ray the object.

Handheld x-ray systems are also employed in the field of non-destructive testing. For example, x-ray imaging is often used to screen for defects in process pipes installed in industrial facilities. These system generally include a handheld x-ray source that is mechanically coupled to an x-ray detector panel. An operator locates the detector panel on the far side of the pipe while standing on the opposite side of the pipe with the x-ray emitting handheld unit. An arm passes over the pipe to mechanically connect the handheld x-ray source to the x-ray detector panel. The direct mechanical connection creates a fixed or very limited range in which to adjust a gap that separates the source instrument and the detector panel. This limits the operating locations in which the system can be deployed. The rigid nature of these system also limits the geometry of the objects that can be scanned. Not only do these systems require a direct mechanical connection between the source-instrument and the detector, they also operate at low energy, typically 70 keV.

Low energy x-ray systems are also employed in the dental field. However, these systems generally do not include a combination of the handheld device and an associated detector panel. These systems also do not operate with a high energy x-ray source.

In practice, it is impractical to construct x-ray backscatter instruments with enough shielding to completely eliminate the x-ray energy that escapes from the instrument. Instead, instruments are designed to meet OSHA regulations that allow operators to use x-ray instruments provided the operator does not receive x-ray energy in an amount that exceeds an established safety threshold over a given period of time. In some cases, an operation of an x-ray instrument that creates exposure greater than that threshold is permissible under the regulations, but only if the individual has completed certified radiation training. However, current approaches include a fixed monitoring of instrument operating time that does not maximize the use of the instrument on an inspection cite.

SUMMARY OF INVENTION

Therefore, there is a need for approaches that facilitate the use of high energy x-ray sources in a handheld instrument. There is also a need to provide the preceding in combination with a detector panel that is not mechanically coupled to the handheld source-instrument. In particular, there is a need for a detector panel that is positioned independently of the handheld instrument including a high energy x-ray source. In addition, there is a need for handheld instruments including a high energy x-ray source having different collimator geometries that can be safely employed.

According to embodiments, an x-ray imaging system including a collimator geometry producing an x-ray beam having a wide radius is provided. These systems are configured to be safely deployed in congested areas and areas of hi pedestrian traffic. In some embodiments, the x-ray imaging system includes a handheld instrument including a high energy x-ray source having an output of 120 keV or greater and a freestanding detector panel that is positioned independent of the handheld instrument. That is, the detector panel is mechanically uncoupled from the handheld instrument.

According to one aspect, an x-ray system employed for x-ray scanning of an object includes a detector panel configured to capture an x-ray image of the object being scanned and a handheld x-ray instrument. In some embodiments, the handheld x-ray instrument includes an x-ray source that provides a high energy x-ray output centered on a projection axis, a collimator configured to receive the high energy x-ray output and project a cone-shaped x-ray beam along the projection axis, a first line laser, a second laser line, a camera substantially aligned with the projection axis, an integral display configured to display a digital image of the object being scanned by the x-ray source, and a wireless communication system configured to receive, from the detector panel, the x-ray image of the object being scanned. In various embodiments, the cone-shaped x-ray beam has a diameter that increases as a distance from the handheld x-ray instrument increases along the projection axis. Further, the first line laser is oriented to project a first laser line at a first angle relative to the projection axis. The second line laser is oriented to project a second laser line at a second angle relative to the projection axis, the first angle and the second angle, respectively, selected to provide a separation distance between the first laser line and the second laser line that is substantially equal to the diameter at any distance along the projection axis. In some embodiments, the camera is configured to capture a digital image of the object being scanned by the x-ray source, the digital image including a camera image of a surface area of the object that faces the x-ray source.

According to another embodiment, an x-ray system employed for x-ray scanning of an object includes a detector panel configured to capture an x-ray image of the object being scanned and a handheld x-ray instrument. In some embodiments, the handheld x-ray instrument includes an x-ray source that provides a high energy x-ray output centered on a projection axis, a collimator configured to receive the high energy x-ray output and project a cone-shaped x-ray beam along the projection axis, the cone-shaped x-ray beam having a diameter that increases as a distance from the handheld x-ray instrument increases along the projection axis, a first pair of line lasers, a second pair of line, a camera substantially aligned with the projection axis, the camera configured to capture a digital image of the object being scanned by the x-ray source, an integral display configured to display together both the x-ray image captured by the detector panel and the digital image, respectively, and a wireless communication system configured to receive, from the detector panel, the x-ray image of the object being scanned. Further, the detector panel and the handheld x-ray instrument are free of any mechanical interconnection between one another such that the detector panel can be moved freely and located on a side of the object opposite a side of the object from which the x-ray source is output by the handheld x-ray instrument, independent of a position at which the handheld x-ray instrument is located on the side of the object from which the x-ray source is output.

According to these embodiments, the first pair of line lasers includes an upper line laser oriented to project a first laser line at a first angle relative to the projection axis, and a lower line laser oriented to project a second laser line at a second angle relative to the projection axis, the second laser line projected parallel to the first laser line, the first angle and the second angle, respectively, selected to provide a first separation distance between the first laser line and the second laser line that is substantially equal to the diameter at any distance along the projection axis. The second pair of line lasers includes a first-side line laser oriented to project a third laser line at a third angle relative to the projection axis, and a second-side line laser oriented to project a fourth laser line at a fourth angle relative to the projection axis, the fourth laser line projected parallel to the third laser line, the third angle and the fourth angle, respectively, selected to provide a second separation distance between the third laser line and the fourth laser line that is substantially equal to the first separation distance, each of the third laser line and the fourth laser line, respectively, projected perpendicular to each of the first laser line and the second laser line, respectively. According to these embodiments, the first laser line, the second laser line, the third laser line and the fourth laser line combine to define a parallelogram when displayed on a surface of the object being scanned.

In various embodiments, the camera is configured to capture video imaging of the surface with the parallelogram displayed thereon and the digital image is captured during a period in which the x-ray source is outputting the high energy x-ray output.

According to another aspect, a method of capturing an x-ray image of an object using a handheld x-ray instrument in combination with a detector panel is provided where the handheld x-ray instrument includes an x-ray source that outputs a high energy x-ray, a collimator configured to project a cone-shaped x-ray beam, a first line laser, a second line laser, a camera, an integral display and a wireless communication system. According to some embodiments, the method includes acts of generating, using the x-ray source, a high energy x-ray output centered on a projection axis, projecting a cone-shaped x-ray beam along the projection axis, orienting the first line laser to project a first laser line at a first angle relative to the projection axis, and orienting the second line laser to project a second laser line at a second angle relative to the projection axis. According to these embodiments, the second laser line is projected parallel to the first laser line. The method also includes selecting the first angle and the second angle, respectively, to provide a separation distance between the first laser line and the second laser line that is substantially equal to the diameter of the cone-shaped x-ray beam at any distance along the projection axis, orienting the camera to capture a digital image of the object being scanned by the x-ray source, receiving, by the handheld x-ray system, an x-ray image of the object captured by the detector panel when the object is x-rayed using the high energy x-ray output, and displaying together, on the integral display, both the x-ray image and the camera image, respectively. According to these embodiments, the cone-shaped x-ray beam is formed by the collimator from the high energy x-ray output received from the x-ray source and has a diameter that increases as a distance from the handheld x-ray instrument increases along the projection axis. According to these embodiments, the digital image includes a camera image of a surface area of the object that faces the x-ray source, and the x-ray image is wirelessly communicated from the detector panel for receipt by the wireless communication system.

According to yet another embodiment, a method of aligning a high energy x-ray output from a handheld x-ray instrument with an object to be scanned for x-ray image capture is provided where the handheld x-ray instrument includes a collimator configured to receive the high energy x-ray output and project a cone-shaped x-ray beam centered along a projection axis, the cone-shaped x-ray beam having a diameter that increases as a distance from the handheld x-ray instrument increases along the projection axis, an integral display and a camera substantially aligned with the projection axis. According to this embodiment, the method includes projecting, from the handheld x-ray instrument, each of a first laser line at a first angle relative to the projection axis, a second laser line at a second angle relative to the projection axis, a third laser line at a third angle relative to the projection axis, and a fourth laser line at a fourth angle relative to the projection axis, the fourth laser line projected parallel to the third laser line, aiming the handheld x-ray instrument to project a parallelogram defined by a combination of the first laser line, the second laser line, the third laser line and the fourth laser line on a surface of the object being scanned, and displaying in the integral display a digital image of the surface of the object being scanned captured by the camera, the digital image including the parallelogram displayed thereon.

According to this embodiment, the second laser line is projected parallel to the first laser line and the first angle and the second angle, respectively, are selected to provide a first separation distance between the first laser line and the second laser line that is substantially equal to the diameter at any distance along the projection axis. Further, the third laser line is projected perpendicular to the first laser line where the third angle and the fourth angle, respectively, are selected to provide a second separation distance between the third laser line and the fourth laser line that is substantially equal to the diameter at any distance along the projection axis.

The term "high energy" as used herein with reference to an x-ray source refers to an x-ray source having an output of 120 keV or greater. Those of ordinary skill in the art will recognize based on the disclosure provided herein, that handheld backscatter x-ray systems employ a high energy x-ray source to x-ray objects located behind steel panels. Those of ordinary skill in the art will also recognize based on the disclosure provided herein that a 70 keV source, a 60 keV source or a lower energy source are not high energy x-ray sources as the term high energy is used herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
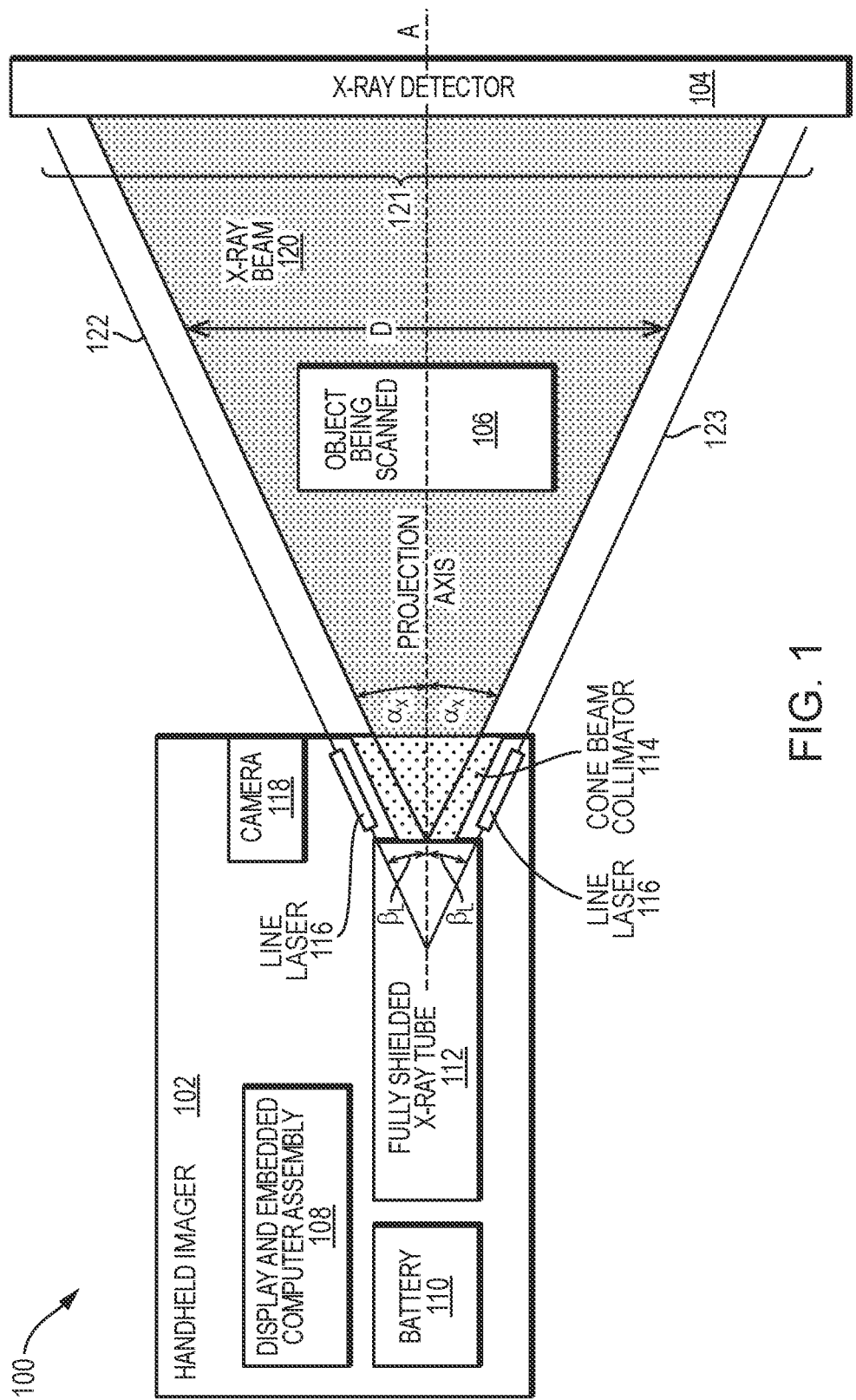
FIG. 1 illustrates a block diagram of an x-ray imaging system in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Referring to FIG. 1, a block diagram of an x-ray imaging system 100 is illustrated in accordance with one embodiment. The x-ray imaging system 100 includes a handheld instrument 102 and a detector panel 104. In general, the system 100 operates to scan an object 106 with x-rays to provide an image of the internal contents of the object. According to the illustrated embodiment, the handheld instrument 102 includes an electronic system 108, a battery 110, a source of x-ray energy 112, a collimator 114, line lasers 116 and a camera 118. In operation, the handheld instrument 102 outputs an x-ray beam 120 centered on a projection axis A where the x-ray beam has a diameter D that increases with increasing distance from the collimator 114.

The electronic system 108 includes a processor, microcontroller or other computing device, memory, a display, a wireless communication system, power conversion circuitry and signal processing circuitry. The display is viewable from the top side of the handheld instrument 102. The display allows an operator to view the imaging captured during a scanning operation, for example, to view the x-ray image in substantially real time while operating the handheld instrument 102. In general, with reference to a display of an x-ray image on the handheld instrument 102, "substantially real time" refers to display of the x-ray image on the handheld instrument within less than 45 seconds of the time at which the x-ray source is activated. According to some embodiments, "substantially real time" refers to display of the x-ray image on the handheld instrument within less than 20 seconds of the image being captured by the detector panel 104. For example, according to one embodiment, the detector panel 104 processes the x-ray image in approximately 10-15 seconds and communicates the image to the handheld instrument 102 for display within another 2-3 seconds. These embodiments can increase the utilization of the x-ray imaging system 100 because they operate so quickly.

The battery 110 provides operating power to the electronic system 108 including providing power to the high voltage power supply that drives the source of x-ray energy 112. The battery 110 includes a rechargeable battery in various embodiments. The battery 110 can include one or more battery cells, for example, lithium or alkaline batteries.

The source of x-ray energy 112 can be provided in a fully shielded package that delivers a known amount of x-ray energy, for example, a high energy x-ray source according to some embodiments. The source of x-ray energy can also be packaged in a self-contained system that includes the high voltage power supply for the x-ray source. In various embodiments, a high energy x-ray output is provided to deliver penetrating power suitable for scanning objects located behind steel panels up to 25 mm thick.

The size and geometry of the collimator 114 can vary depending on the embodiment provided that they are suitable for use in a handheld instrument. In various embodiments, a collimator having a cone shape is employed. These embodiments output a cone-shaped x-ray beam with a known diameter that increases as the distance from the handheld instrument 102 increases. The larger diameter of the x-ray beam produced with a cone-shaped collimator facilitates the capture of a single x-ray image of the entirety of objects having various lengths and widths. In contrast to backscatter instruments that employ sweeping pencil beam collimators, an entire object can be scanned without the need to move the handheld instrument 102 while the instrument is generating an x-ray beam. As a result, the system 100 captures the x-ray image in at a single moment in time. Again, this contrasts with operation of a backscatter instrument that generates an x-ray during the entire period of a scan in which an operator slowly moves the instrument over each region of the object being scanned. According to the illustrated embodiment, the cone-shaped x-ray beam is produced with the collimator 114 having a cone shape where the x-ray beam has a projection angle $\alpha_x$ relative to the projection axis A.

According to various embodiments, the line lasers 116 are located within the handheld instrument 102 adjacent the collimator 114. According to one embodiment, four line lasers 116 are provided, for example, where a first pair of line lasers project respective vertical laser lines (not illustrated) on opposing sides of the x-ray beam 120 and a second pair of line lasers project respective horizontal laser lines 122, 123 above and below the x-ray beam 120. In general, the line lasers project the laser lines with a brightness level that allows a user to see the lasers lines on a wide variety of surfaces in a wide variety of different levels of ambient light. For example, they should generate a laser line with sufficient brightness such that it can be seen on a brightly lit surface of a light colored object. Further, the line lasers 116 are positioned at angles relative to the axis of the collimator such that a laser line projected 122, 123 from each laser 116 is substantially aligned with the outside diameter of the cone shaped x-ray beam 120. According to the illustrated embodiment, the line lasers 116 project laser lines at an angle $\beta_L$ relative to the projection axis A. In some embodiments, the angle $\beta_L$ equals the angle $\alpha_x$ to maintain a consistent alignment of the laser line adjacent the outside diameter of the x-ray beam 120. In these embodiments, a distance 121 separating laser lines projected on opposite sides of the x-ray beam 120 is substantially equal to the diameter of the x-ray beam. The preceding is true at any distance from the instrument along the projection axis. Thus, the laser lines when displayed on a surface provide a clear identification of the boundary of x-ray beam. This allows an operator to properly aim the instrument before energizing the source of x-ray energy to capture an x-ray image of the object. In practice, operators can align the handheld instrument 102 to properly aim the x-ray beam by relying on this relationship with the laser-lines projected either: on a surface of an object to scan a selected region; or onto a surface behind the object being scanned to confirm that the entire object will be x-rayed.

According to various embodiments, the camera 118 is employed to record video and/or still images of the object during the x-ray imaging operation, for example, digital video or digital still images. In these embodiments, the images taken by the camera 118 capture the object being scanned when the laser lines 122, 123 are being projected by the line lasers 116. According to some embodiments, a video camera is employed to allow the capture of still images or video of the scanning operation. According to one embodiment, a 12 megapixel camera is employed, for example, a camera employed in cellphones. In some embodiments, the camera 118 is substantially aligned with the projection axis A. As used with reference to the alignment of the camera and the x-ray output, the term "substantially" refers to the fact that the x-ray image and the photographic image both capture the same area of the object being scanned. For example, the camera 118 and the collimator 114 are pointed in the same direction from locations in the handheld instrument 100 that are adjacent to one another. This can be achieved, for example, by locating the camera sensor within two inches or less of the projection axis A. According to another embodiment, a mirror is located at the projection axis A to reflect an image of the object 106 being scanned toward the camera 118. According to this embodiment, the camera 118 points in a radial inward direction relative to the projection axis A.

According to the illustrated embodiment, the system 100 includes the detector panel 104 in addition to the handheld instrument 102. In overall operation, the detector panel 104 directly acquires the x-ray image and wirelessly communicates the image to the handheld instrument 102 where it is saved in memory and displayed on the display included in the electronic system 108. The detector panel 104 includes a scintillator to capture an x-ray image. In one embodiment, the x-ray image is captured at a resolution of 5 line pairs per millimeter (lp/mm). In various embodiments, the detector panel 104 includes a variety of features configured for portability. According to one embodiment, the detector panel includes a carbon fiber housing, has an overall weight of 4 kg (including an integral battery) and is only 15 mm thick. In one embodiment, the battery is in the housing of the detector panel from which it can be removed for charging. According to various embodiments, the detector panel includes a data communication system that provides 5 Ghz wi-fi communication. The preceding is provided in a configuration that does not require an external antenna. The data communication can also include a wired data communication system, for example, an ethernet communication system such as Gigabit Ethernet (GigE). The detector panel can also include a rechargeable battery to provide self-contained operation. According to some embodiments, a lithium ion polymer battery is employed to provide five hours or greater operating power for the detector panel 104.

As illustrated in FIG. 1, the portability of the detector panel 104 and absence of any mechanical connection between the detector panel 104 and the handheld instrument 102 results in a system 100 that provides an adaptable configuration. For example, the object being scanned 106 can be any type of package that is in a location accessible to an operator of the handheld instrument 102.

Figure 2:
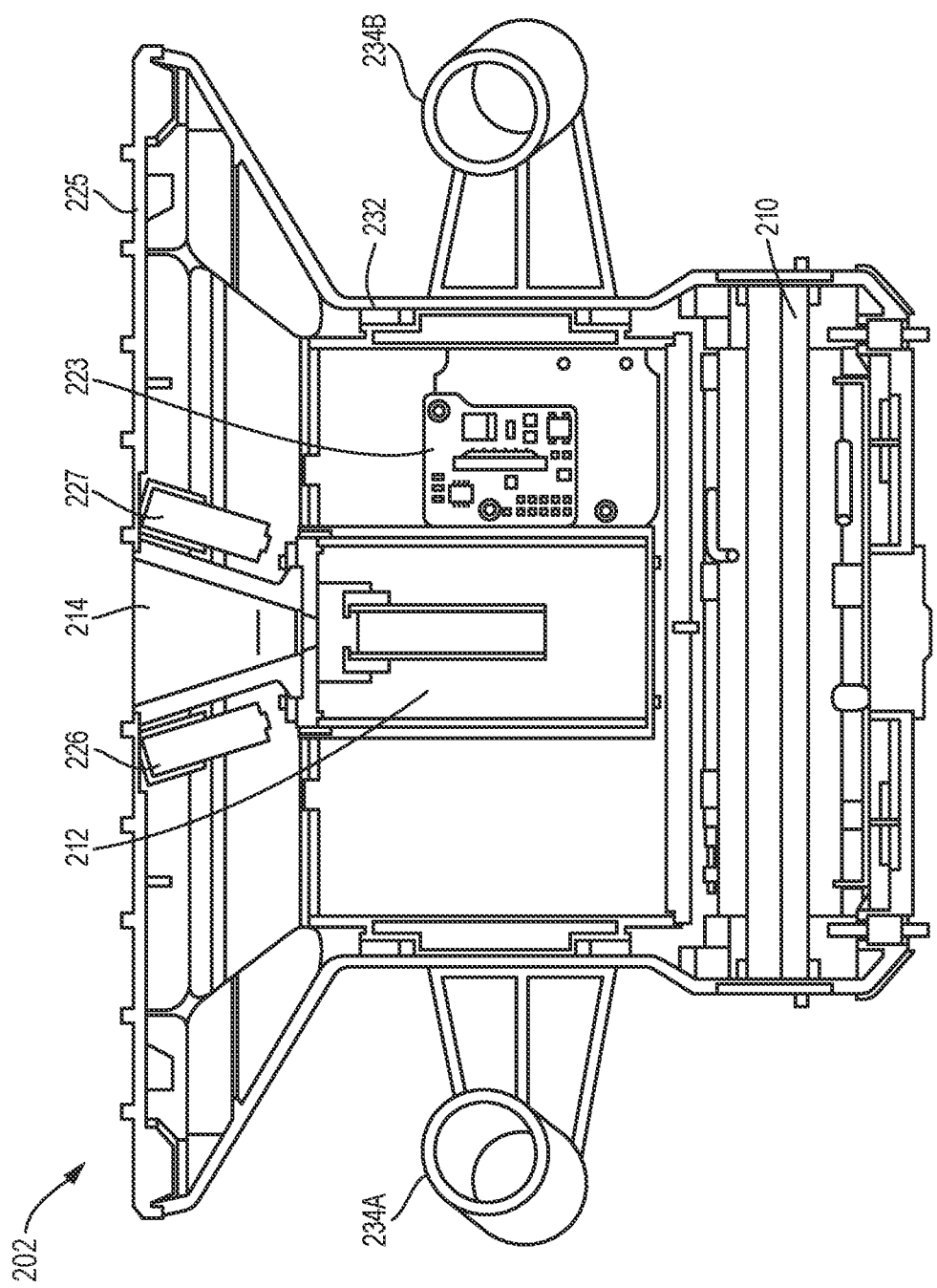
FIG. 2 illustrates a top view of a horizontal cross-section of a handheld x-ray instrument in accordance with one embodiment.

Referring now to FIG. 2, a top view of a horizontal cross-section of a handheld x-ray instrument 202 is illustrated in accordance with one embodiment. In various embodiments, the handheld instrument 202 is employed in a system that includes a detector panel, for example, the system 100 and the detector panel 104. The cross-sectional view illustrates a fully shielded x-ray tube 212, a collimator 214, a housing 232, a high voltage power supply controller 223, a pair of handles 234A, 234B, a screen 225 a first line laser 226 and a second line laser 227. In general, the handheld x-ray instrument 202 is operated with the operator holding each of the two handles 234A, 234B while pointing the front face of the instrument at the object being scanned.

The collimator 214 is positioned adjacent the fully shielded x-ray tube 212 to receive x-rays generated by the x-ray tube and project the collimated x-ray beam out the front of the instrument 202. According to the illustrated embodiment, the collimator 214 has an overall cone shape such that the instrument 202 projects a cone-shaped x-ray beam as illustrated in FIG. 1. The high voltage power supply controller 223 illustrated in FIG. 2 converts energy received from the battery 210 to a high voltage output employed to operate the x-ray tube 212. According to various embodiment, the x-ray tube 212 emits an x-ray beam at an energy level of at least 120 keV. According to one embodiment, the x-ray tube 212 emits an x-ray beam at an energy level of 140 keV. These embodiments allow the system including the handheld instrument 102, 202 and detector panel 104 to provide x-ray images of objects located behind steel with a thickness of 25 mm or more.

The housing 232 provides an enclosure within which the elements of the instrument 202 are located, including the battery 210, the x-ray tube assembly 212, the collimator 214, the high voltage power supply controller 223 and the electronic system (for example, the electronic system 108 as illustrated in FIG. 1). The housing is manufactured of ABS plastic or other suitable rugged and lightweight material. The handles 234A, 234B are located on opposite sides of the housing 232 and can be formed as an integral part of the housing in some embodiments. The screen 225 is a plastic material used as a part of the housing 232 to protect the internal components housed in the housing.

Figure 3:
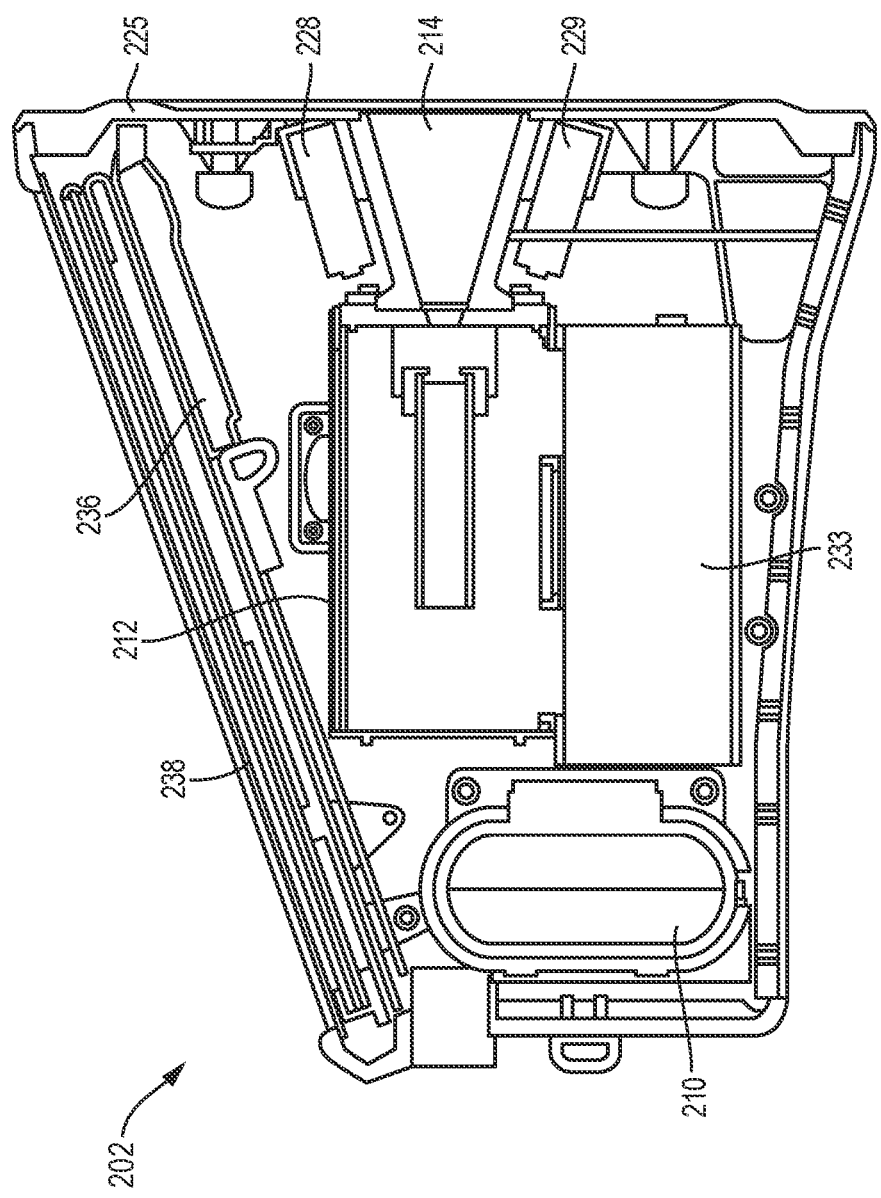
FIG. 3 illustrates a side view of a vertical cross-section of the handheld x-ray instrument of FIG. 2.

Referring now to FIG. 3, a side view of a vertical cross-section of the handheld x-ray instrument 102 is illustrated in accordance with one embodiment. This cross-sectional view again illustrates the battery 210, the x-ray tube assembly 212, the collimator 214 and the screen 225. In addition, FIG. 3 also illustrates a third line laser 228 and a fourth line laser 229 where these two line lasers are responsible for generating laser lines located adjacent the top and the bottom of the x-ray beam 120. In addition, FIG. 3 illustrates, a high voltage power supply 233, the electronic system 236 and the display 238.

The high voltage power supply 233 is employed to receive the power provided from the integral battery and generate the much greater voltage applied to the x-ray tube. According to some embodiments, the high voltage power supply 233 generates an output voltage employed with the x-ray tube to generate a high energy x-ray output. In other embodiments, the high voltage power supply 233 generates an output voltage employed with the x-ray tube to generate a lower energy x-ray output, for example, 60 or 70 keV or less.

In some embodiments, the electronic system 236 includes a processor, microcontroller or other computing device that includes firmware and other software programs that control operation of the hardware included in the handheld instrument 202. For example, in addition to the display 238, the hardware can include I/O such as pushbuttons and other styles and types of switches or selectors, and connections for data and power, respectively. The electronic system 236 can also include the communication system including a wireless communication system and, in some embodiments, a combination of a wireless communication system and a wired communication system.

The display 238 is employed to display x-ray images received by the handheld instrument 202 from the associated detector panel, for example the detector panel 104. The display can also be employed to allow an operator to properly align the instrument with video provided by the integral camera 118, or share video or still images captured by the camera. According to some embodiments, the display allows x-ray images and camera images to be displayed together. In various embodiments, the display 238 includes a touch screen display. In these embodiments, the display 238 can include a user interface configured to receive touch inputs and/or navigation via an on-screen cursor that is moved with the selection of hardware I/O elements accessible to the operator at the handles 234A, 234B.

The electronic system 236 can also include memory configured to store software instructions for controlling the operation of the hardware included in the handheld instrument 202. In various embodiments, the software includes an operating system for the instrument 202. The software instructions can include one or more algorithms or other programs, for example, algorithms for determining a run time of the instrument 202, control of the display 238 or other elements of the system including communication with the detector panel. In one embodiment, the memory is included in the processor. In another embodiment, memory is included both internal to the processor and external to the processor. The memory can include both read only memory (ROM) and non-volatile random access memory (RAM).

Figure 4:
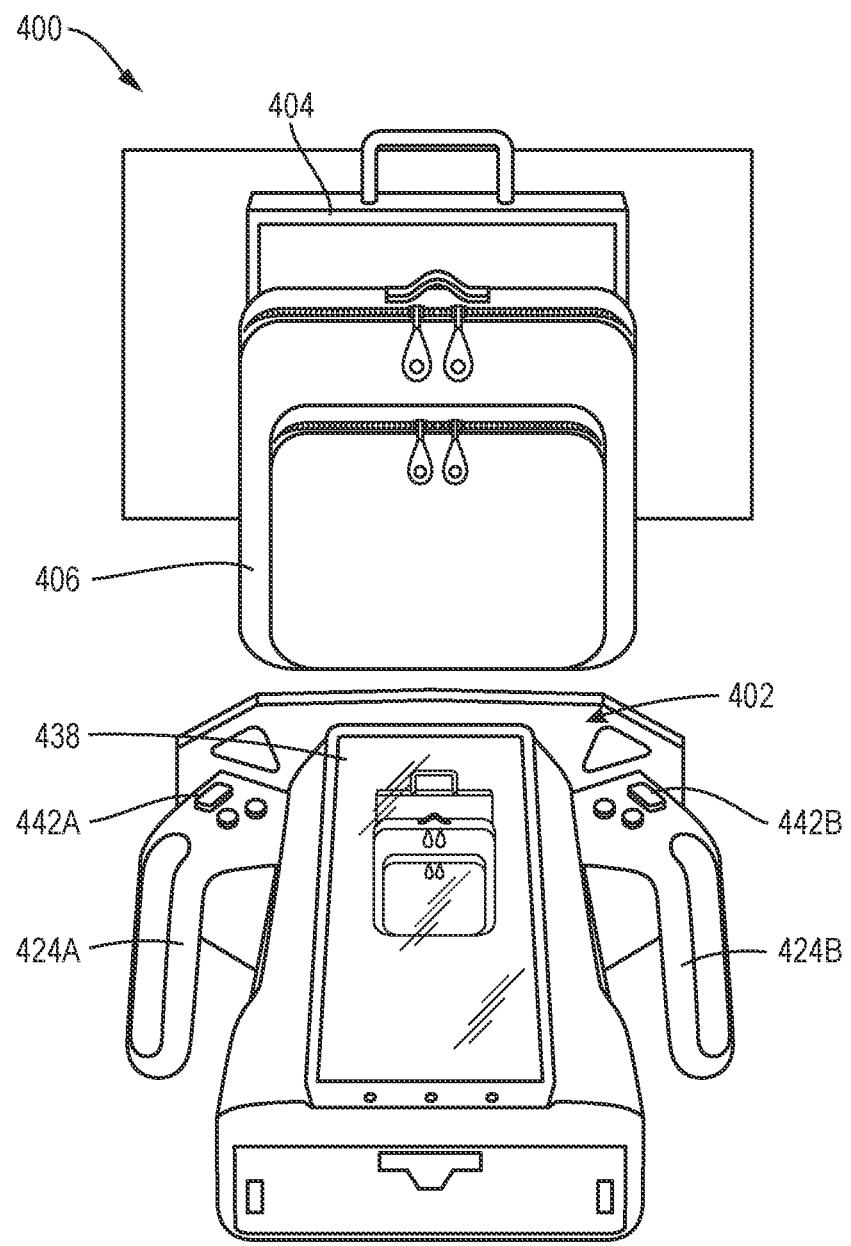
FIG. 4 illustrates an x-ray imaging system in operation in accordance with one embodiment.

Referring now to FIG. 4, a system 400 is illustrated along with an object 406 for scanning. The system 400 includes a handheld instrument 402 and a detector panel 404. FIG. 4 provides an external view of the handheld instrument 402 showing a display 438, and sets of control elements 442A, 442B located where the handles 424A, 424B, respectively, meet the body of the instrument 402. The display 438 includes a GUI with icon-based inputs and an image captured by the camera of the object 406 to be scanned currently being displayed. The display is employed to provide the x-ray image while an object is being scanned. In FIG. 4, each of the handheld instrument 402, the detector panel 404 and the object 406 are set into alignment while resting on the same surface. However, the portability of the detector panel 404 and the freedom of movement provided with handheld instrument 402 permit the scanning of objects in a wide variety of spaces and orientations. Further, these system characteristics allow objects of varying geometry having a wide variety of sizes and shapes to be x-rayed.

Figure 5:
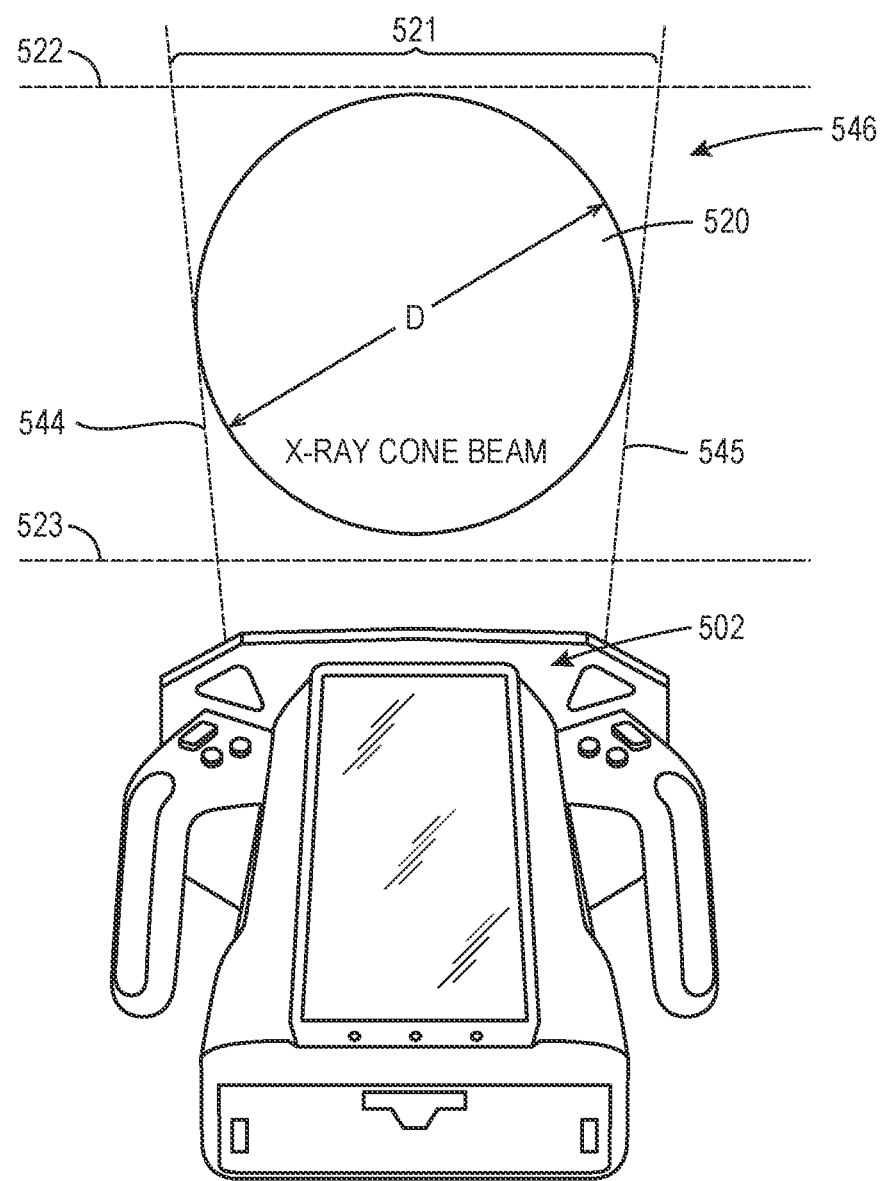
FIG. 5 illustrates a size of an x-ray beam produced by the x-ray imaging system of FIG. 4 in accordance with one embodiment.

FIG. 5 includes a handheld instrument 502 in operation with some additional annotation to illustrate operation when aligning the x-ray beam with an object to be scanned. FIG. 5 includes a large red circle representing the x-ray beam 520 striking a surface 546 at which the x-ray beam is directed. At the distance shown in FIG. 5, the x-ray beam has a diameter D. As described above, laser lines projected by line lasers (for example, 226, 227, 228, 229) included in the instrument 502 are employed to properly align the x-ray beam with the object being scanned. Here, the pair of horizontal laser lines 522, 523 are projected onto the surface at which the x-ray beam is directed with the handheld instrument 502 in use. FIG. 5 also illustrates a pair of vertical laser lines 544, 545 that are projected onto the surface 546. The laser lines 522, 523, 544, 545 are projected such that each of the respective pairs 522/523, 544, 545 is separated by the distance 121 substantially equal to the diameter D of the x-ray beam. The laser lines 522, 523, 544, 545 are also projected at angles that place the lines immediately adjacent the outside diameter of the x-ray beam 520.

The overall operation of the system 400 can begin with both powering the handheld instrument 402 on and powering the detector panel 404 on. As described herein, the handheld instrument 402 and the detector panel can include a respective battery to provide operating power for these system elements. A wireless communication link is established between the handheld instrument 402 and the detector panel 404, for example, a wi-fi connection is employed in various embodiments. The operator employs a user interface provided in the display 438 to enter the x-ray imaging application for x-ray image capture and display using the detector panel 404. The detector panel 404 is located behind the object to be scanned. With the line lasers operating and the live image from the camera displayed on the display, the operator shifts the position of the handheld instrument 402 to properly align the instrument with the object to be scanned. The x-ray imaging and visual image are simultaneously acquired when the operator activates the x-ray source with the press of a button included in the control elements 442A, 442B. The x-ray image is displayed on the display 438 while the x-ray image is being captured. The x-ray image and the corresponding visual image are automatically saved in memory included in the handheld instrument 402. Once saved, the x-ray images can be reviewed and manipulated by the operator as needed to enhance an image of the contents included in the object that was scanned. For example, the application includes standardized x-ray image filters that can be applied to the saved x-ray images.

As described above, the nature of handheld x-ray imaging equipment is such that some level of x-ray radiation is generally received by the operator of the equipment. According to some embodiments, the handheld instrument 102, 202, 402 includes an algorithm that monitors the run time of the instrument to limit the radiation received by the operator. The algorithm measures the "on-time" of the instrument (the time during which the x-ray source is producing x-ray energy). According to one embodiment, the instrument logs the x-ray scans during a rolling 60 minute window. This information is processed to limit the on-time such that the total dose of radiation received by the operator never exceeds a specified maximum dose established for a given time-period. These embodiments can maximize the operating time and corresponding thru-put of objects at a scanning location when the instruments are deployed in the field.

According to some embodiments, the handheld instrument operates to control a duty-cycle of the instrument to limit the maximum x-ray exposure to an amount that is at or below the maximum dose established in the applicable safety regulation. For example, a regulatory agency such as the Occupational Safety and Health Administration (OSHA) currently sets 2 millirem per hour as a maximum dose received by an operator of a handheld x-ray instrument in the U.S. According to one embodiment, the handheld instrument 102, 202, 402 displays a graphic in the display 238, 438 to provide visual feedback to the operator concerning the current amount of operating time that remains available for the user. In various embodiments, the graphic includes indicia that visually conveys a rate of change to the available operating time for the user. According to one embodiment, the indicia includes a bar graph. For example, the length of the bar graph will increase when the instrument is not emitting x-rays and decrease when the instrument is emitting x-rays. According to these embodiments, the rate of change during operation of the instrument (periods of x-ray emissions) corresponds to the estimated rate at which an operator is receiving x-ray energy from the handheld instrument. For example, the permissible on time in a pre-defined time period (or "duty cycle") decreases with an instrument that emits more x-ray energy. The source of x-rays is turned off when the bar graph reaches zero. That is, additional run time of the instrument is unavailable for the operator at that time. Conversely, the bar graph will increase in length and run time is added as the handheld instrument is not emitting x-rays.

While the above-described embodiments refer to x-ray imaging systems employed in security screening applications, the apparatus, system and method illustrated and described herein can be employed in other fields in various embodiments.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An x-ray system employed for x-ray scanning of an object, the x-ray system comprising:
    a detector panel configured to capture an x-ray image of the object being scanned; and
    a handheld x-ray instrument including:
        an x-ray source that provides a high energy x-ray output centered on a projection axis;
        a collimator configured to receive the high energy x-ray output and project a cone-shaped x-ray beam along the projection axis, the cone-shaped x-ray beam having a diameter that increases as a distance from the handheld x-ray instrument increases along the projection axis;
        a first line laser oriented to project a first laser line at a first angle relative to the projection axis, a second line laser oriented to project a second laser line at a second angle relative to the projection axis, the first angle and the second angle, respectively, selected to provide a separation distance between the first laser line and the second laser line that is substantially equal to the diameter at any distance along the projection axis;
        a camera substantially aligned with the projection axis, the camera configured to capture a digital image of the object being scanned by the x-ray source, the digital image including a camera image of a surface area of the object that faces the x-ray source;
        an integral display configured to display the digital image of the object being scanned by the x-ray source; and
        a wireless communication system configured to receive, from the detector panel, the x-ray image of the object being scanned.

2. The x-ray system of claim 1, wherein the detector panel is configured to be located on a side of the object opposite a side of the object from which the cone-shaped x-ray beams is projected by the handheld x-ray instrument, and
    wherein the detector panel and the handheld x-ray instrument are free of any mechanical interconnection between one another.

3. The x-ray system of claim 1, wherein the surface area includes a surface sized to encompass the diameter of the cone-shaped x-ray beam at the distance from the handheld x-ray instrument at which the object is located.

4. The x-ray system of claim 1, wherein the first laser line is an upper laser line,
    wherein the second laser line is a lower laser line that is projected parallel to the first laser line,
    wherein the handheld x-ray instrument includes a third line laser oriented to project a third laser line at a third angle relative to the projection axis,
    wherein the handheld x-ray instrument includes a fourth line laser oriented to project a fourth laser line at a fourth angle relative to the projection axis,
    wherein the third angle and the fourth angle are selected to provide a separation distance between the third laser line and the fourth laser line that is substantially equal to the diameter at any distance along the projection axis, and
    wherein the third laser line and the fourth laser line are projected parallel to one another and perpendicular to each of the first laser line and the second laser line.

5. The x-ray system of claim 4, wherein the first laser line, the second laser line, the third laser line and the fourth laser line combine to define a parallelogram when displayed on the surface of the object being scanned, and
    wherein the image of the object being scanned by the x-ray source includes an entirety of a region of the surface of the object being scanned upon which the parallelogram is displayed.

6. The x-ray system of claim 5, wherein the digital image provided by the camera is rendered for display in the display in combination with the x-ray image of the object captured by the detector panel when the object is x-rayed using the high energy x-ray output.

7. The x-ray system of claim 1, wherein the digital image provided by the camera includes a video image.

8. The x-ray system of claim 1, wherein the camera includes a camera sensor, and
    wherein the substantial alignment of the camera is achieved by locating the camera sensor within a maximum of two inches distance from the projection axis.

9. An x-ray system employed for x-ray scanning of an object, the x-ray system comprising:
    a detector panel configured to capture an x-ray image of the object being scanned; and
    a handheld x-ray instrument including:
        an x-ray source that provides a high energy x-ray output centered on a projection axis;

a collimator configured to receive the high energy x-ray output and project a cone-shaped x-ray beam along the projection axis, the cone-shaped x-ray beam having a diameter that increases as a distance from the handheld x-ray instrument increases along the projection axis;

a first pair of line lasers including an upper line laser oriented to project a first laser line at a first angle relative to the projection axis, and a lower line laser oriented to project a second laser line at a second angle relative to the projection axis, the second laser line projected parallel to the first laser line, the first angle and the second angle, respectively, selected to provide a first separation distance between the first laser line and the second laser line that is substantially equal to the diameter at any distance along the projection axis;

a second pair of line lasers including a first-side line laser oriented to project a third laser line at a third angle relative to the projection axis, and a second-side line laser oriented to project a fourth laser line at a fourth angle relative to the projection axis, the fourth laser line projected parallel to the third laser line, the third angle and the fourth angle, respectively, selected to provide a second separation distance between the third laser line and the fourth laser line that is substantially equal to the first separation distance, each of the third laser line and the fourth laser line, respectively, projected perpendicular to each of the first laser line and the second laser line, respectively, the first laser line, the second laser line, the third laser line and the fourth laser line combining to define a parallelogram when displayed on a surface of the object being scanned;

a camera substantially aligned with the projection axis, the camera configured to capture a digital image of the object being scanned by the x-ray source, the camera configured to capture video imaging of the surface with the parallelogram displayed thereon;

an integral display configured to display together both the x-ray image captured by the detector panel and the digital image, respectively, the digital image captured during a period in which the x-ray source is outputting the high energy x-ray output; and a wireless communication system configured to receive, from the detector panel, the x-ray image of the object being scanned, wherein the detector panel and the handheld x-ray instrument are free of any mechanical interconnection between one another such that the detector panel can be moved freely and located on a side of the object opposite a side of the object from which the high energy x-ray output is emitted by the handheld x-ray instrument, independent of a position at which the handheld x-ray instrument is located on the side of the object from which the high energy x-ray output is emitted.

10. The x-ray system of claim 9, wherein the detector panel can be moved freely and located on the side of the object opposite the side of the object from which the high energy x-ray output is emitted by the handheld x-ray instrument, independent of the position of the handheld x-ray instrument, with the handheld x-ray instrument in position to begin the x-ray scan.

11. The x-ray system of claim 9, wherein the image provided by the camera is rendered for display in the display in combination with the x-ray image of the object captured by the detector panel when the object is x-rayed using the high energy x-ray output.

12. A method of capturing an x-ray image of an object using a handheld x-ray instrument in combination with a detector panel, the handheld x-ray instrument including an x-ray source that outputs a high energy x-ray, a collimator configured to project a cone-shaped x-ray beam, a first line laser, a second line laser, a camera, an integral display and a wireless communication system, the method comprising:

generating, using the x-ray source, a high energy x-ray output centered on a projection axis;

projecting a cone-shaped x-ray beam along the projection axis, the cone-shaped x-ray beam formed by the collimator from the high energy x-ray output received from the x-ray source, the cone-shaped x-ray beam having a diameter that increases as a distance from the handheld x-ray instrument increases along the projection axis;

orienting the first line laser to project a first laser line at a first angle relative to the projection axis;

orienting the second line laser to project a second laser line at a second angle relative to the projection axis, the second laser line projected parallel to the first laser line;

selecting the first angle and the second angle, respectively, to provide a separation distance between the first laser line and the second laser line that is substantially equal to the diameter of the cone-shaped x-ray beam at any distance along the projection axis;

orienting the camera to capture a digital image of the object being scanned by the x-ray source, the digital image including a camera image of a surface area of the object that faces the x-ray source;

receiving, by the handheld x-ray system, an x-ray image of the object captured by the detector panel when the object is x-rayed using the high energy x-ray output, the x-ray image wirelessly communicated from the detector panel for receipt by the wireless communication system; and displaying together, on the integral display, both the x-ray image and the camera image, respectively.

13. The method of claim 12, wherein the first line laser and the second line laser form a first pair of line lasers, wherein the handheld x-ray instrument includes a second pair of line lasers including a third line laser and a fourth line laser, and wherein the method further comprises:

orienting the third line laser to project a third laser line at a third angle relative to the projection axis, the third laser line projected perpendicular to the first laser line;

orienting the fourth line laser to project a fourth laser line at a fourth angle relative to the projection axis, the fourth laser line projected parallel to the third laser line;

selecting the third angle and the fourth angle, respectively, to provide a separation distance between the third laser line and the fourth laser line that is substantially equal to the diameter of the cone-shaped x-ray beam at any distance along the projection axis; and displaying a parallelogram formed by a combination of the first laser line, the second laser line, the third laser line and the fourth laser line on a surface of the object being scanned, the parallelogram delineating to an operator of the x-ray instrument an area on the surface which the cone-shaped x-ray beam is striking.

14. The method of claim 12, wherein the x-ray image is a first x-ray image, wherein the camera image is a first camera image, and wherein the method further comprises:

capturing and displaying, on the integral display, each of the first x-ray image and the first camera image with the handheld x-ray instrument in a first location and orientation on a first side of the object being scanned and the detector panel in a second location and orientation on a second side of the object being scanned, the second side being opposite the first side, capturing and displaying, on the integral display, each of a second x-ray image and a second camera image with the handheld x-ray instrument in a third location and orientation on the first side of the object being scanned and the detector panel in a fourth location and orientation on the second side of the object being scanned, and wherein each of the handheld x-ray instrument and the detector panel, respectively, can be moved freely independent of the position of the other.

15. The method of claim 14, wherein the handheld x-ray instrument includes an integral memory, and wherein the method further comprises:

saving each of the first x-ray image, the second x-ray image, the first camera image and the second camera image, respectively, in the integral memory.

16. A method of aligning a high energy x-ray output from a handheld x-ray instrument with an object to be scanned for x-ray image capture, the handheld x-ray instrument including a collimator configured to receive the high energy x-ray output and project a cone-shaped x-ray beam centered along a projection axis, the cone-shaped x-ray beam having a diameter that increases as a distance from the handheld x-ray instrument increases along the projection axis, an integral display and a camera substantially aligned with the projection axis, the method comprising:

projecting a first laser line at a first angle relative to the projection axis, from the handheld x-ray instrument;

projecting a second laser line at a second angle relative to the projection axis, from the handheld x-ray instrument, the second laser line projected parallel to the first laser line, the first angle and the second angle, respectively, selected to provide a first separation distance between the first laser line and the second laser line that is substantially equal to the diameter at any distance along the projection axis;

projecting a third laser line at a third angle relative to the projection axis, from the handheld x-ray instrument, the third laser line projected perpendicular to the first laser line;

projecting a fourth laser line at a fourth angle relative to the projection axis, the fourth laser line projected parallel to the third laser line, the third angle and the fourth angle, respectively, selected to provide a second separation distance between the third laser line and the fourth laser line that is substantially equal to the diameter at any distance along the projection axis, aiming the handheld x-ray instrument to project a parallelogram defined by a combination of the first laser line, the second laser line, the third laser line and the fourth laser line on a surface of the object being scanned; and displaying in the integral display a digital image of the surface of the object being scanned captured by the camera, the digital image including the parallelogram displayed thereon.

17. The method of claim 16, further comprising changing a position of the handheld x-ray instrument to shift the location of the parallelogram displayed on the surface of the object being scanned in advance of producing the high energy x-ray output to capture an x-ray image of the object being scanned.

* * * * *